United States Patent [19]

Pollack

[11] Patent Number: 5,411,298
[45] Date of Patent: May 2, 1995

[54] HIGH PRESSURE SEAL ARRANGEMENT

[75] Inventor: Jack Pollack, Camarillo, Calif.

[73] Assignee: Imodco, Inc., Calabasas Hills, Calif.

[21] Appl. No.: 63,433

[22] Filed: May 18, 1993

[51] Int. Cl.$^6$ ............................................. F16L 7/00
[52] U.S. Cl. .............................. 285/94; 285/106;
  285/108; 285/111; 285/276; 285/330
[58] Field of Search ............ 285/136, 106, 98, 94,
  285/374, 111, 276, 108, 330

[56] References Cited

U.S. PATENT DOCUMENTS

| | | | |
|---|---|---|---|
| 3,884,511 | 5/1975 | Hermonson | 285/98 X |
| 4,555,118 | 11/1984 | Saliger . | |
| 4,602,806 | 7/1986 | Saliger . | |
| 4,647,076 | 3/1987 | Pollack et al. | 285/111 X |
| 4,669,758 | 6/1987 | Feller et al. | 285/108 X |
| 4,781,404 | 11/1988 | Tharp et al. | 285/136 X |
| 4,828,292 | 5/1989 | Jansen | 285/136 X |
| 4,925,219 | 5/1990 | Pollack et al. | 285/98 X |

*Primary Examiner*—Dave W. Arola
*Attorney, Agent, or Firm*—Arthur Freilich; Robert Hornbaker; Leon Rosen

[57] ABSTRACT

A fluid swivel is described, of the type that carries oil, water or natural gas at high pressure between an undersea well and a weathervaning ship, which has a seal device of increased lifetime. The seal device (56, FIG. 2) lies in a cavity of a first swivel part (12) and includes a rigid seal ring (62) that is slidable toward and away from a sealed surface (66). A deformable seal (60) can be backed up by the seal ring, with the seal ring sliding to close the extrusion gap (70) into which the seal could extrude when high pressure fluid enters the swivel. A pressure source (80) coupled to the cavity urges the backup part to deform radially and slide toward the sealed surface with a force that increases as the pressure of fluid in the swivel increases. Both upstream and downstream ends (89, 99) of the seal ring are closely guided in movement toward and away from the sealed surface, and/or the dynamic side of the seal ring lies closely adjacent to the sealed surface at both its upstream and downstream end portions (180, 194, FIG. 9). The seal device can include only the more rigid seal ring (284, FIG. 12). The sealed surface (162, FIG. 8) can lie on the outer swivel part, with the seal ring being forced by fluid pressure to expand in diameter, rather than contract.

23 Claims, 6 Drawing Sheets

HIGH PRESSURE SEAL ARRANGEMENT

BACKGROUND OF THE INVENTION

Large, high pressure fluid swivels are commonly used in offshore hydrocarbon floating production systems. Such a fluid swivel may have a sealing surface diameter of between two and eight feet (0.6 to 2.5 meters) and carry fluid at a working pressure of over 1,000 psi (70 mega Pascals, or 70 MPa). In such a system, hydrocarbons such as oil and natural gas as well as other fluids, are transferred between an undersea well and a ship, the fluid swivel allowing the ship to weathervane (turn with changing winds, waves and currents). Such fluid swivels typically include inner and outer ring-shaped swivel parts rotating on one another. An annular chamber is formed between the swivel parts, and a pair of gap passages extend from the chamber to the environment. One or more seal devices lie along each gap passage, in a ring-shaped cavity of a swivel part, to prevent the leakage of pressured fluid into the environment. Each seal device includes a seal formed of low friction soft (relative to engineering metals) material and a harder backup ring on the downstream side of the pressure seal to support it.

One source of problems with fluid swivels of the type described above, arises from extrusion of the dynamic side of the soft seal material into the "extrusion gap" formed between the backup ring and the sealed surface region that is sealed against. Such extrusion results in seal failure. Extrusion is avoided by keeping the gap between the backup ring and sealed surface very small. U.S. Pat. No. 4,602,806 describes an arrangement where the backup ring can slide toward the sealed surface under the pressure of fluid in the swivel, which minimizes the extrusion gap. Improvements in systems where the backup ring or other corresponding member can be pushed toward the sealed surface be an increasing force as higher pressure fluid is applied to the swivel, would be of value.

SUMMARY OF THE INVENTION

In accordance with the present invention, improved seal devices are provided for a high pressure fluid swivel. A first swivel part has a ring-shaped cavity that holds a seal device. In one embodiment of the invention, the seal device includes a soft seal having a dynamic side that seals against a sealed surface of the second swivel part. The seal device also includes a seal ring that backs up the seal to avoid seal extrusion into an extrusion gap. The seal ring is forced to slide towards the sealed surface to close the extrusion gap, by the pressure of the fluid applied to the fluid swivel. The seal ring is prevented from tilting, or cocking, by closely guiding both its upstream and downstream ends in sliding movement, and/or by enabling support of seal ring portions lying both upstream and downstream of the seal, against the sealed surface.

In another embodiment of the invention, the seal assembly includes just the seal ring, lying in the first swivel part cavity, with the dynamic side of the seal ring sealing directly against the sealed surface. The same arrangement is provided to prevent the seal ring from tilting, or cocking.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
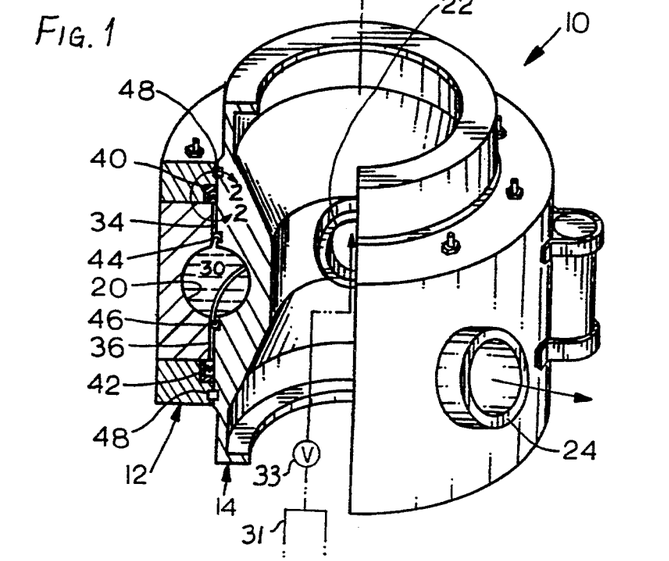
FIG. 1 is a partially sectional isometric view of a fluid swivel constructed in accordance with one embodiment of the present invention.

FIG. 1 illustrates a high pressure fluid swivel 10 of the present invention, which includes outer and inner swivel walls or parts 12, 14 that rotate relative to each other about an axis 16. Each of the parts forms about half of an annular chamber 20 between them. An inlet 22 on one of the parts such as the inner one, may be connected to a hydrocarbon well and receives fluid to pass through the fluid swivel, while the other part such as the outer one forms an outlet 24 through which the fluid passes out of the fluid swivel. Several fluid swivels of the type illustrated in FIG. 1 may be stacked on one another. Typically, the outer swivel part 12 is fixed to a ship to weathervane with it, while the inner part 14 is connected to a riser that extends up from the floor of the ocean to the ship. A source of high pressure fluid 30 of a pressure of at least 1,000 psi (70 MPa), such as an undersea well indicated at 31, may pass fluid up through a riser and through a valve 33 to the fluid swivel inlet 22. The valve 33 can be closed to stop the application of high pressure fluid to the fluid swivel.

The fluid swivel forms a pair of gap passages 34, 36 extending from the annular chamber 20 to the environment. The fluid swivel parts have adjacent faces along the gap passages. It may be noted that it is possible to design a fluid swivel with a single gap passage. A seal arrangement 40, 42 lies along each gap passage. A low or zero pressure isolation seal 44, 46 lies along each gap passage. A pair of bearing assemblies 48 rotatably connect the swivel parts.

Figure 2:
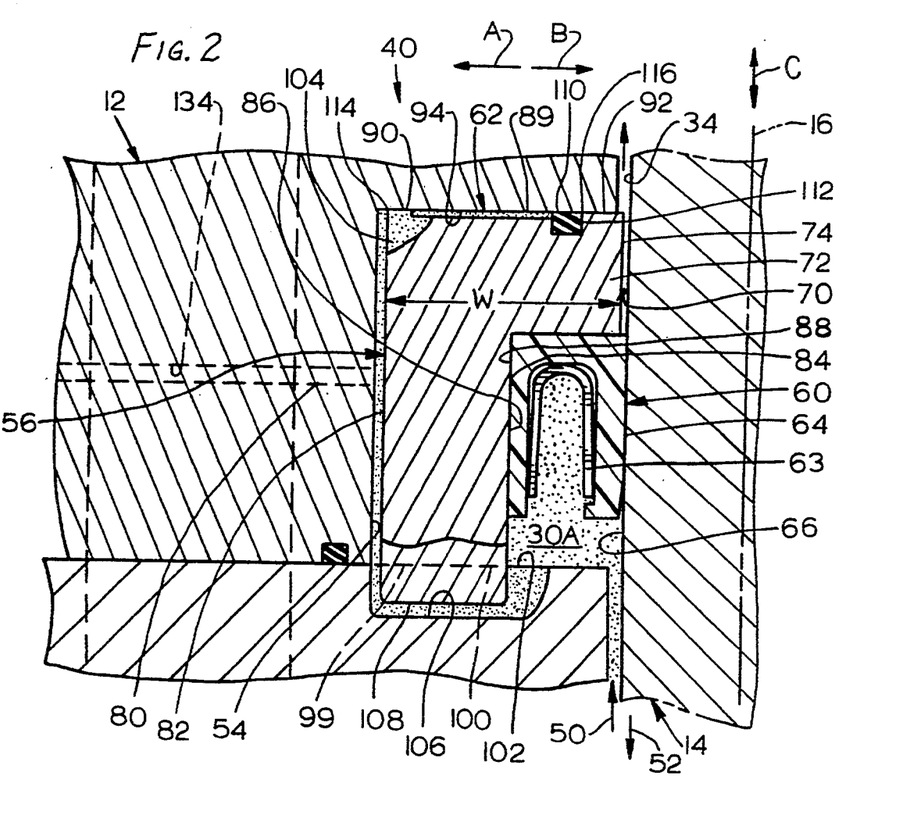
FIG. 2 is a sectional view of the region 2—2 of FIG. 1.

FIG. 2 shows details of one of the seal arrangements 40 which blocks the passage of high pressure fluid 30A that would otherwise move along the gap passage 34 into the environment. Arrow 50 indicates the downstream direction along which pressured fluid tends to move, while arrow 52 indicates the opposite upstream direction. The seal arrangement includes walls forming an annular or groove-shaped cavity 54 in a first swivel part which is the outer part 12. A seal device 56 lies in the cavity and includes a deformable pressure seal 60 and a seal ring 62. The pressure seal 60, which extends substantially 360° about the axis of the fluid swivel, is of "wing" cross-sectional shape and includes a spring 63 that spreads apart the wings. The seal has a dynamic side 64 that presses against a sealed surface region 66 of the inner swivel part 14 to block fluid flow. The seal 60 turns with the seal ring 62 and outer swivel part 12 relative to the inner swivel part 14, about the swivel axis 16. The seal arrangement is a radial one, in that the seal presses in a radial direction relative to axis 16.

The pressure seal 60 is of relatively soft material such as TEFLON, to provide a tight sliding seal. Such soft material is in danger of extrusion into a gap 70 at the downstream end of the seal dynamic side. Extrusion is avoided by making the gap 70 small, especially when there is a large pressure difference across the seal as when the fluid pressure is over 1,000 psi (70 MPa) and the pressure in the gap 70 is close to zero (atmospheric). The seal ring 62 has a backup part 72 lying behind the downstream end of the seal 60. The backup part has a dynamic side 74 lying close to the sealed surface region 66 to determine the width of the gap 70.

Applicant mounts the seal ring 62 so it and its backup part 72 is slidable in shift directions A, B which are radial to the axis of rotation 16. That is, the seal ring 62 can shift in the radial directions A, B relative to the outer swivel part 12 and the walls of its cavity 54. When high pressure fluid lies in the fluid swivel annular chamber, a pressure source presses the seal ring 62 in the radially inward direction B to bring the dynamic side 74 of the backup part closer to the sealed surface region 66. The pressure source 80 is a source of fluid such as dean oil which lies in the cavity 54, with the pressure of the oil 30A pressing against a far side 82 of the seal ring to urge it to shift radially inwardly relative to the walls of the cavity 54.

The seal ring has a leg 84 which extends upstream from the backup part 72 and which has an abutment side 86 that abuts a distal side 88 of the seal 60. The leg also forms the far side 82 of the seal ring which is furthest from the gap passage 34. As the seal ring 62 shifts in the radially inward direction B, it compresses the seal 60, which provides some small resistance to such radially inward shift. However, most of the resistance to the radially inward shift of the seal ring, and of its backup parts 72, is due to the fact that such radially inward shifting amounts to a reduction of the inside diameter of the seal ring.

In accordance with the present invention, applicant locates the seal ring 62 in the cavity, in a manner that prevents axial shifting of the seal ring in the axial direction C, while allowing the seal ring to shift radially. To this end, the downstream end 89 of the seal ring has a pair of lands 90, 92 that lie against a corresponding flat downstream cavity surface or wall 94. The land 90 is unsealed, while land 92 is sealed (by a largely static seal 110). The upstream end 99 of the seal ring has a surface 100 that abuts a corresponding flat surface 102 of the cavity walls. The upstream and downstream cavity walls 102, 94 extend perpendicular to the sealed surface, or toward and away from it. The upstream and downstream ends 99, 88 of the seal ring, at the lands 90, 92 and surface 100, form guide locations that slidably guide the seal ring in radial movement. Such slidable guiding prevents any portion of the seal ring from tilting, or cocking, which could cause one end of the dynamic side 74 of the backup part to shift away from the sealed surface region 66. Such cocking could result in an increased width of the extrusion gap 70; also, such cocking could result in high force of one end of the seal ring against the sealed surface region, which could result in high friction (unless the seal ring were constructed to press hard against the seal surface). For a seal ring of two inch (50 mm) width and length, a tilt of 1° about its center would cause its downstream end to move 20 thousandths inch (0.5 mm) toward or away from the sealed surface. A 1° tilt about its distal upstream corner would cause twice as much movement. Thus, the seal ring is guided closely enough to prevent more than 1° of tilt, and preferably no more than 0.5° of tilt.

Figure 3:
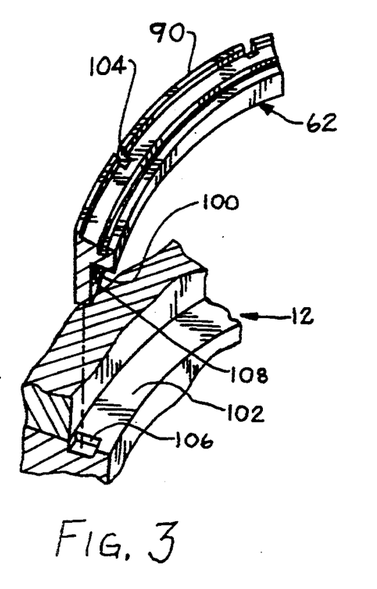
FIG. 3 is a partial isometric view of the seal ring and first wall of the fluid swivel of FIG. 2.

Applicant prefers to install the seal ring so there is substantially no gap, and even slight interference between the cavity end walls 94, 102 and corresponding surfaces on the seal ring. Even a slight interference fit will not prevent the seal ring from moving radially inwardly and outwardly under the high pressures applied to it. Applicant forms several grooves 104 along the land 90 to allow the high pressure fluid to readily press against much of the downstream end of the seal ring. Similarly, applicant forms four grooves 106 at the upstream end of the cavity, through which high pressure fluid can pass. The seal ring has four corresponding drive keys 108 that lie in the grooves 106 to prevent relative rotation of the seal ring and cavity walls.

Applicant seals the seal ring 62 to the cavity walls only at a mid location 110, where an O-ring static seal 112 provides a fluid-tight largely static seal (although the static seal can shift in the radial direction along with the seal ring). The largely static seal 112, which is much softer than the seal ring, seals the downstream end of the seal ring to the downstream cavity wall 94. The static seal 112 is important to prevent pressured fluid from leaking into the downstream end of the gap passage 34. Applicant prefers to locate the O-ring seal at location 110 which is closer to the sealed surface 66 than to the downstream end 114 of the distal side 82 of the seal ring. This results in only a small net force urging the seal ring in a downstream direction. Applicant prefers that the distance between the downstream end 116 of the static seal (where sealing is accomplished) and the sealed surface 66 be no more than one-fourth the distance between the distal side end 114 and the sealed surface. The O-ring 112 makes a sliding seal only when the fluid swivel is pressurized or depressurized, which occurs only once in a great while.

Figure 4:
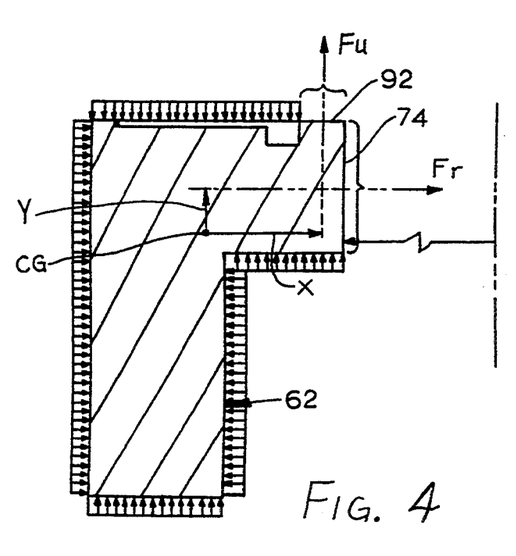
FIG. 4 is a sectional view of the seal ring of FIG. 2, showing forces thereon.

FIG. 4 shows the seal ring 62 and shows the forces acting on it. The full pressure of the high pressure fluid acts on all surfaces of the seal ring cross section, except for the area of the land 92, and except for the dynamic side 74 of the backup part of the seal ring. As a result, there is a net upward force Fu pressing the seal ring upwardly. Also, there is a net rightward force Fr extending over the area 74, pressing the seal ring to the right. The center of gravity of the seal ring cross section is indicated at CG. The upward force Fu acts at a distance X from the center of gravity. The rightward force Fr acts at a distance Y from the center of gravity. Applicant prefers to dimension the seal ring so the clockwise torque YFr is substantially balanced by the counter clockwise torque XFu. This minimizes the tendency of the seal ring to cock. By using relatively long downstream and upstream ends, applicant also avoid cocking of the seal ring.

Figure 5:
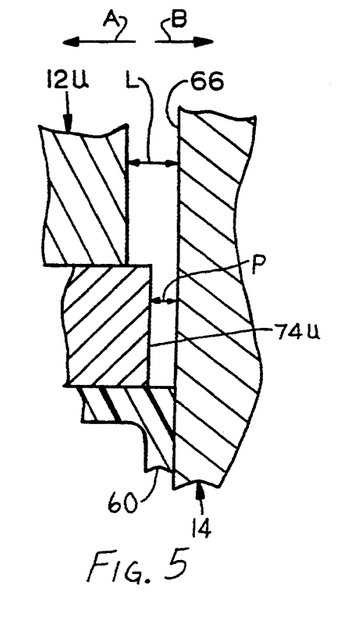
FIG. 5 is an enlarged view of the seal arrangement of FIG. 2, when there is zero pressure in the fluid swivel.
Figure 6:
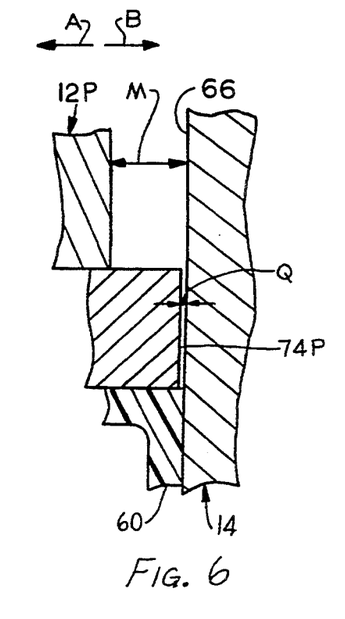
FIG. 6 is a view similar to that of FIG. 5, but with working pressure in the fluid swivel.

FIGS. 5 and 6 show relative positions of the outer wall when the fluid swivel is unpressured at 12U in FIG. 5, and when the fluid swivel is under maximum, or working, pressure at 12P in FIG. 6. When the fluid swivel is unpressured, the gap passage width L downstream of the seal assembly is moderate, such as 0.5 mm or 20 mil (1 mil equals one thousandth inch). When the swivel is highly pressured, the gap width increases to M as shown in FIG. 6, which may be several mil larger than L. When the swivel is unpressured, the dynamic side 74U of the seal ring is spaced a moderate distance P from the sealed surface 66. When the swivel is fully pressured, the dynamic side 74P of the seal ring forms a small gap Q, which may be zero or even a slight interference fit. When there is zero or low pressure in the fluid swivel, there is unlikely to be extrusion of the soft seal 60 into the gap of width P, so a wider gap is not highly objectionable. However, when a high pressure of over 1,000 psi (70 MPa) is applied, the gap width at Q must be very small to prevent extrusion. Thus, the seal ring 62 shifts in the direction B opposite to the shift direction A of the outer wall 12U, 12P when the pressure in the fluid swivel increases greatly.

Applicant constructs the seal ring 62 of a material such as aluminum bronze that is softer than the typical steel sealed surface regions 66 and that has good bearing characteristics thereagainst, to assure low friction contact when the seal ring dynamic side 74 (FIG. 2) bears against the sealed region 66.

Figure 7:
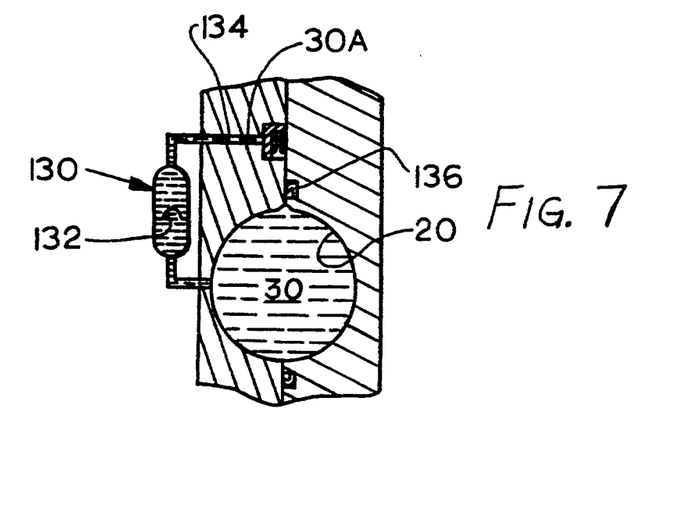
FIG. 7 is a simplified view of apparatus for supplying pressured fluid to the seal arrangement of FIG. 2.

The fluid 30A in the cavity 54 is preferably a clean fluid such as a clean oil, as opposed to the typical dirty fluid that passes through the annular chamber of the fluid swivel. FIG. 7 is a simplified view of a common prior art arrangement for supplying the clean fluid. A source 180 of clean fluid 30A includes a diaphragm 132 with one side coupled to the annular chamber 20 and the other side coupled to a storage region for the clean fluid. The storage region feeds the clean fluid through a conduit 134 to the cavity. A zero pressure isolation seal 136 lies along the gap passage to minimize mixing of dirty oil in the annular chamber with the clean oil 30A in the cavity. It is possible to make the pressure of fluid in conduit 134 slightly higher than the fluid pressure than the pressure in the annular chamber. The reason for a slightly higher pressure is to more reliably prevent gaseous components of the dirty fluid from reaching the seal and causing blistering when the pressure drops. The clean fluid pressure in that case may be five per cent higher than the fluid in the annular chamber at maximum pressure. It may be noted that it is possible to press the seal ring radially inwardly by other pressure source such as a piezo electric actuator.

Figure 8:
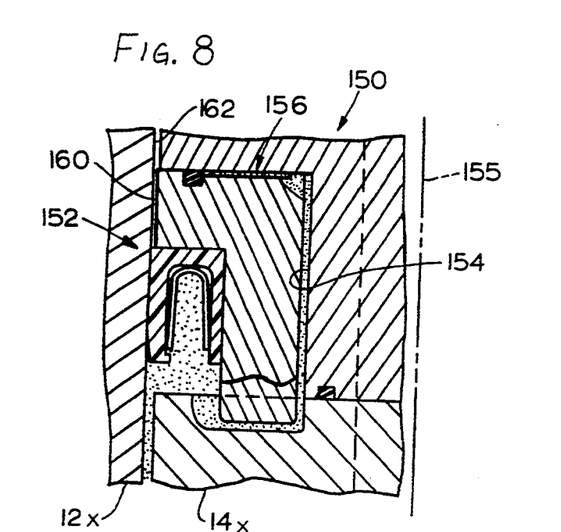
FIG. 8 is a partial sectional view of a fluid swivel arrangement constructed in accordance with another embodiment of the invention, wherein the seal assembly is contained in the inner wall of a fluid swivel.

FIG. 8 illustrates a seal arrangement 150 that is similar to that of FIG. 2, except that it includes a seal assembly 152 lying in a cavity 154 of the inner swivel part 14X rather than the outer one 12X. The swivel axis is shown at 155. There is an advantage to positioning the seal arrangement along the inner swivel part, in that it results in the seal ring 156 expanding in diameter instead of contracting in diameter when high pressure fluid is applied to move its dynamic side 160 closer to the sealed surface region 162. When a ring is subjected to expansion forces, it tends to retain a ring shape, while when subjected to compression forces there is a possibility for it to have slight undulating variations from a round or ring shape.

Figure 9:
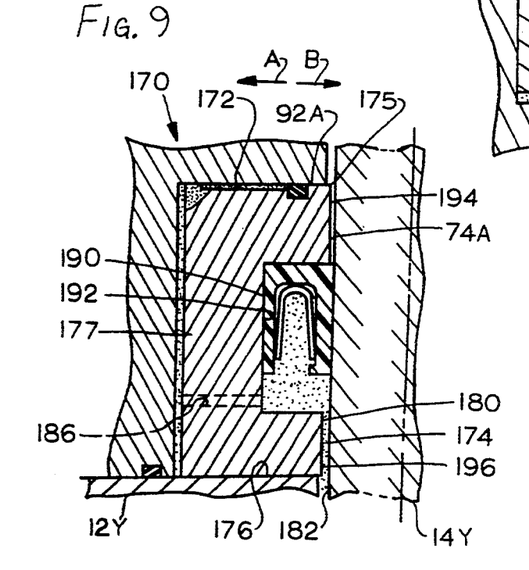
FIG. 9 is a partial sectional view of a seal arrangement modified from that of FIG. 2.

FIG. 9 illustrates a seal arrangement 170 similar to that of FIG. 2, except that the seal ring 172 has an anticock projection 174 at its upstream end. The projection 174 provides a longer upstream guiding face 176 along which the seal ring shifts in the radial directions A, B, and also provides a dynamic side 180 that can abut the sealed surface region 182 to prevent cocking of the seal ring. Cocking is prevented even when high interface pressures occur as a result of seal ring locations 180, 194 pressing against the turning sealed surface region 182. The seal ring has a few grooves 186 in one of the parts to enable high pressure fluid to extend to all the surface of the seal ring except for the location at 92A and at the location 194 of the dynamic side 74A. The U-shaped seal ring 172, with a pair of arms at 174 and 175 joined by a base 177 of the U when viewed in section, therefore is well stabilized against cocking. The seal 190 lies in a ring-shaped recess 192 of the seal ring which faces the sealed surface. Both upstream and downstream locations at 194, 196 lie adjacent to the sealed surface 182. Such locations 194, 196 lie spaced (at least 0.001 inch or 0.025 mm) from the sealed surface 182 when there is zero fluid pressure in the cavity, but lie close enough to the sealed surface at working pressure (above 1000 psi or 70 KPa) to prevent seal ring tilt of more than 0.5°, for reasons discussed below.

Figure 10:
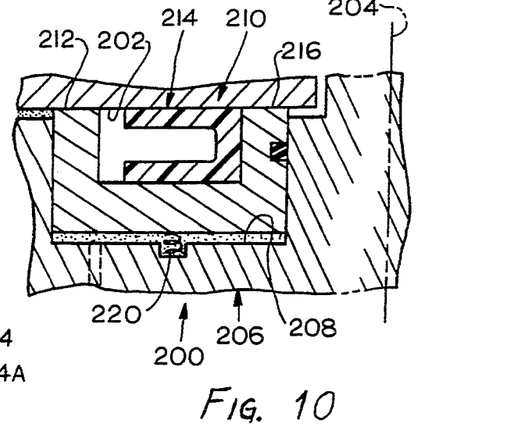
FIG. 10 is a partial sectional view of a seal arrangement for a face seal, and constructed in accordance with another embodiment of the invention.

FIG. 10 illustrates a seal arrangement 200 in the shape of a face seal, wherein the sealed surface 202 is a substantially flat surface rather than a cylindrical one, and extends in a plane perpendicular to the axis of rotation 204 of the fluid swivel. One of the swivel parts such as the inner one 206 has walls forming a cavity 208. A seal assembly 210 includes a U-shaped seal ring 212 and a softer seal 214. The pressure of fluid in the cavity 208 presses the seal ring 212 upwardly so its dynamic surface 216, which lies against the downstream end of the seal 214, presses forcefully against the sealed surface 202. A spring 220 is provided to keep the seal ring upwardly biased when there is zero pressure in the cavity.

As mentioned above, the large high pressure fluid swivels such as shown in FIG. 1, for which the present seal arrangement is especially useful, typically has a seal diameter (the diameter of the location where the seal contacts the sealed surface region) of about two to eight feet (0.6 to 2.5 meters), and carries fluid a high working pressure of at least 1,000 (70 MPa) and up to 6,000 psi (420 MPa) or more. In a fluid swivel of three feet diameter at the sealing surface, the seal ring of FIG. 2 may have a width W of two inches (5 cm) and other dimensions relative to that as shown in FIG. 2. The initial (zero fluid pressure) width of the gap 70 may be 10 mil (0.3 mm). The material of the seal ring 62 and its dimensions are chosen so that at maximum working pressure of 6,000 psi (420 MPa) the dynamic side 74 of the seal ring backup part just touches the sealed surface region 66.

Figure 11:
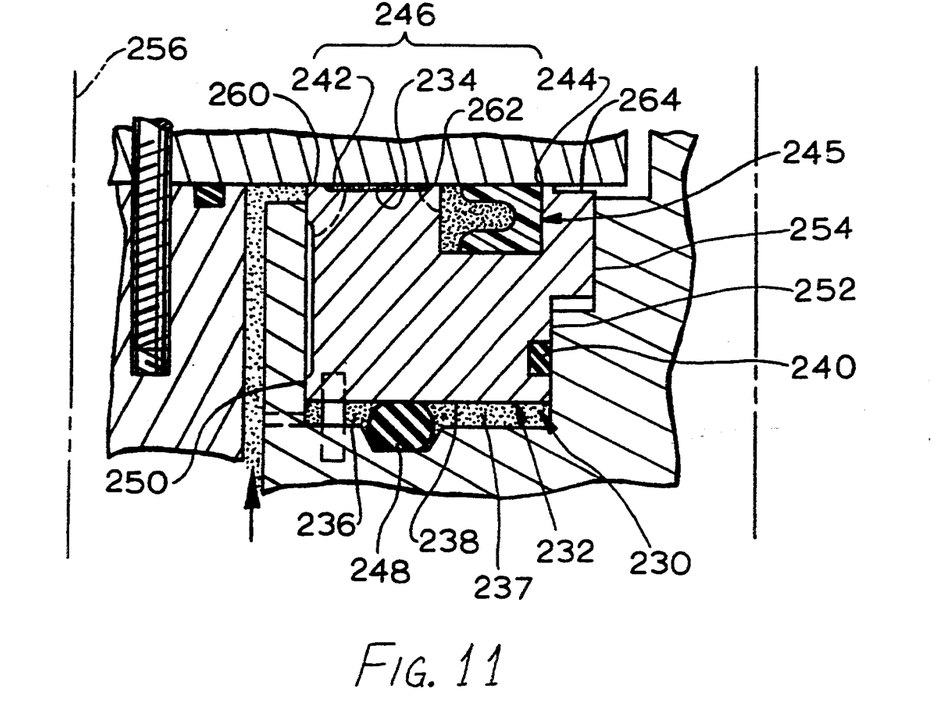
FIG. 11 is a partial sectional view of a seal arrangement for a face seal of another embodiment of the invention.

FIG. 11 illustrates a face seal arrangement 230, which assures that there is only a moderate force pressing the seal ring 232 up against the sealed surface 234. Fluid 236 pushes the distal side 237 of the seal ring up only along the surface 238, in that largely static seal 240 prevents fluid from flowing past itself. The dynamic side 242 of the seal ring is pushed down by fluid pressure, only up to the downstream end 244 of the seal 245. The distal side area at 237 is only slightly greater than the dynamic side area 246 up to location 244, so there is only a small net upward force on the seal ring even when the fluid is at high pressure. A spring 248 in the form of an elastomeric ring, which is not used to form a seal, urges the seal ring upwardly to position the seal ring at zero swivel pressure.

The seal ring cross-section is somewhat U-shaped, with its upstream end 250 and opposite downstream end at 252 and 254 guided in axial sliding with respect to swivel axis 256. Also, the dynamic side of the seal ring is prevented from tilting by a pair of spaced lands 260, 262. Applicant prefers to locate the dynamic surface 264 of a downstream land so it lies slightly (about 0.001 inch or 0.03 mm) away from the sealed surface 234. This is because there is no oil at the land surface 264 so there might be high frictional contact between it and the sealed surface. The land surface 264 prevents substantial tilt of the seal ring.

Figure 12:
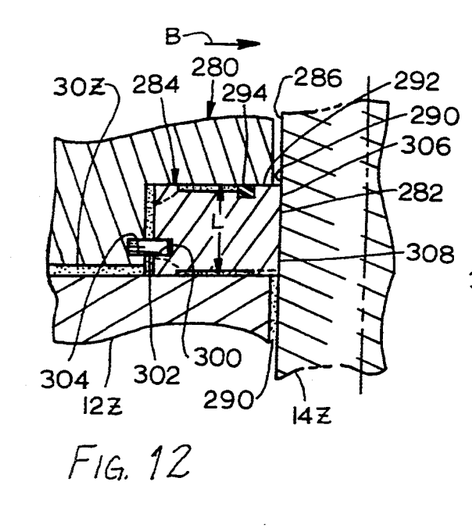
FIG. 12 is a partial sectional view of a radial seal arrangement of another embodiment of the invention.
Figure 13:
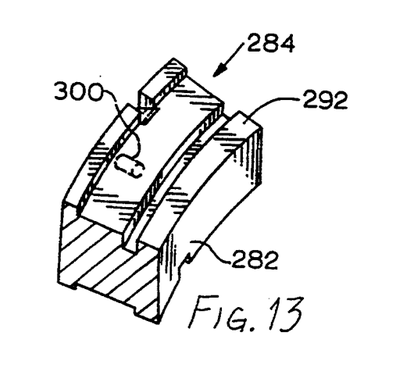
FIG. 13 is a partial isometric view of the seal ring of FIG. 12.

FIG. 12 illustrates a radial seal arrangement 280 which uses the dynamic side 282 of a seal ring 284 to seal against a sealed surface region 286, instead of a softer seal. When pressured fluid is initially applied to the fluid swivel, the swivel parts 12Z, 14Z move apart and the width of the gap passage 290 increases. However, the increased pressure is applied to oil 30Z in the cavity, which causes a contraction of the seal ring in direction B. As a result, the dynamic side 282 of the seal ring remains in direct contact with the sealed surface region 286, even though the swivel part 12Z moves away. All of the seal ring is exposed to the pressured oil 30Z, except for a land 292 that is isolated by a largely static seal 294, and except for the area of the seal ring dynamic surface 282. This approach also can be readily used in a face seal. The seal ring dynamic side 282 must make reliable moderate friction, dynamic sealing contact. An aluminum bronze seal ring can be used against a steel sealed surface region. The dynamic surface 282 can be covered or coated with a softer low friction material. The seal ring 284 has a cylindrical hole 300 which receives a cylindrical driver pin or key 302 whose other end lies in a cylindrical hole or keyway 304 of the swivel part 12Z. The driver key 302 assures that the seal ring will turn with the swivel part 12Z in whose cavity it lies, rather than with the other swivel part 14Z. For a metal seal ring, one or two keys 302 may be sufficient, but a plastic seal ring may require perhaps four or more keys. FIG. 13 shows additional details of the seal ring 284.

The seal ring is stabilized by the fact that upstream and downstream locations 306, 308 on its dynamic side, which are spaced apart by more than half the length L of the seal ring, both contact the sealed surface 286.

Figure 14:
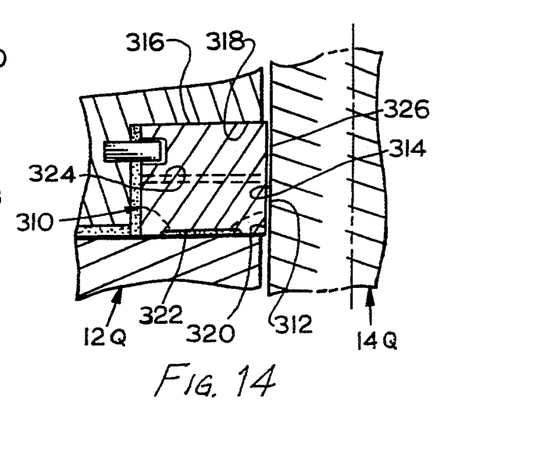
FIG. 14 is a partial sectional view of a radial seal arrangement of another embodiment of the invention.
Figure 15:
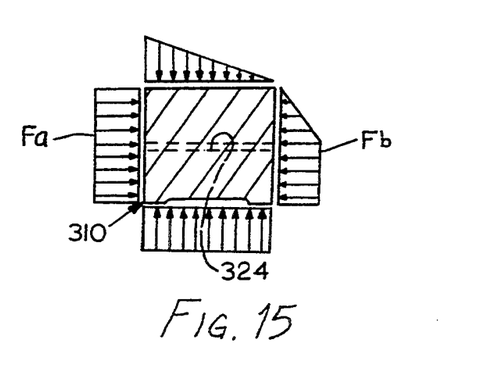
FIG. 15 is a sectional view of the seal ring of FIG. 14, showing forces thereon.

FIG. 14 illustrates another seal ring 310 which has a dynamic side 312 that seals against the sealed surface 314 of swivel part 14Q, and which has a downstream end 316 that seals against a downstream wall 318 of the swivel part 12Q. The dynamic side of the seal ring includes a layer 320 of soft low friction material such as TEFLON on a harder and higher friction block 322 (actually a ring). A passage 324 in the seal ring results in dynamic side sealing only along the downstream portion 326 thereof. This results in a lower net force pushing the seal ring against the sealed surface. FIG. 15 shows the forces on the seal ring. The force against the sealed surface is the difference between forces Fa and Fb, and is only one half the force that would result without the passage 324.

The block 322 of the seal ring of FIG. 14 preferably has a rigidity at least that of engineering plastics such as NYLON, so it has a Young's modulus of at least about 200,000 psi (14,000 MPa). The Young's modulus may be as high as that of steel ($30 \times 10^6$ psi or 2,100 GPa). The sealing layer 320 has a Young's modulus no more than that of an engineering plastic, so it has a Young's modulus of no more than about 400,000 psi (28 GPa), and preferably no more than 200,000 psi (14 GPa).

Figure 16:
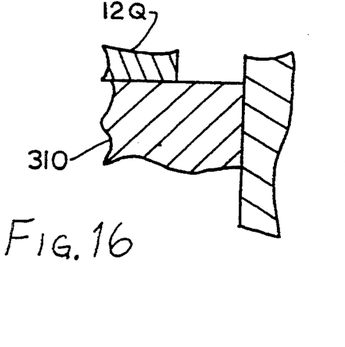
FIGS. 16 and 17 shows portions of the seal arrangement of FIG. 13, respectively at zero fluid pressure and at working pressure.
Figure 17:
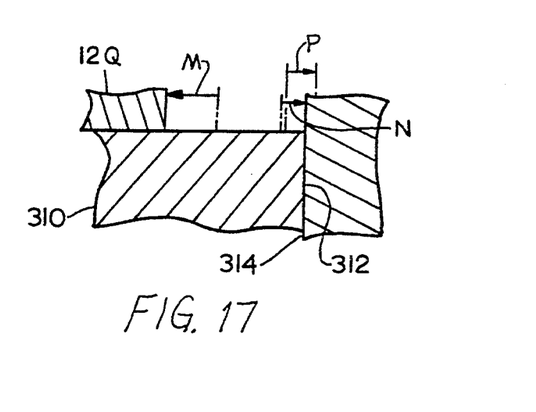

FIG. 16 shows a portion of the fluid swivel of FIG. 14, when there is zero fluid pressure in the cavity. FIG. 17 shows the same portion, but when fluid at working pressure lies in the cavity. In FIG. 17, the outer swivel part 12Q has expanded in radius by the distance M, while the sealed surface 314 has contracted in radius by the distance N. If the distal side 312 of the seal ring were not limited in amount of contraction, it would have contracted by the amount P. While there is only a slight interference between the seal ring and sealed surface at zero pressure, there is a much greater interference fit, such as twice as much, at working pressure.

Figure 18:
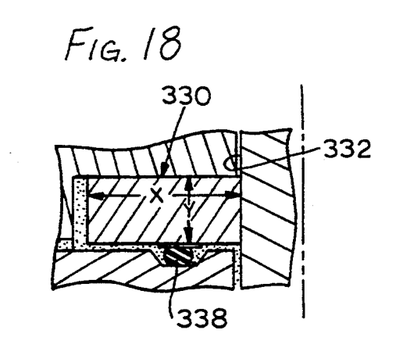
FIG. 18 is a partial sectional view of a seal arrangement of another embodiment of the invention.

FIG. 18 illustrates another seal ring 330 which seals the gap passage 332. The seal ring has a radial dimension X which is more than 50% greater, and preferably more than 100% greater than its axial dimension Y. A spring in the form of an elastomeric ring 334 urges the seal ring in the downstream direction to position it at zero fluid pressure.

Figure 19:
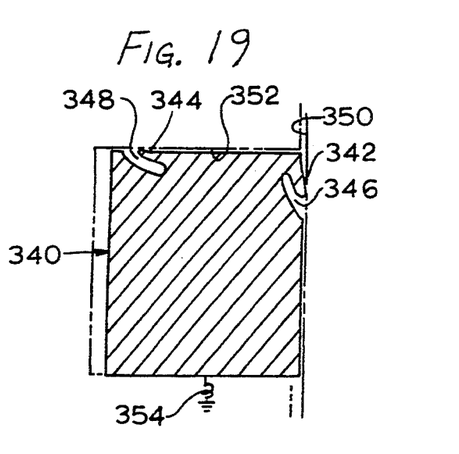
FIG. 19 is a sectional view of a seal ring of another embodiment of the invention, with surrounding portions of the swivel shown in phantom lines.

FIG. 19 illustrates another seal ring 340 which has seal fingers 342, 344 at the downstream ends of recesses 346, 348. In use, the seal fingers are deflected slightly by a sealed surface 350 and a downstream cavity surface 352, and seal against the passage fluid at both locations. A spring 354 positions the seal ring against the downstream surface.

Figure 20:
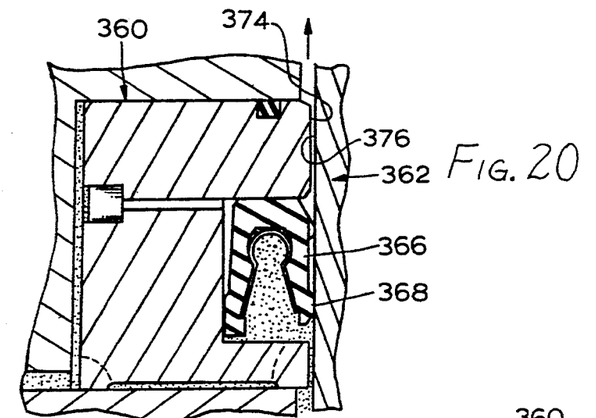
FIGS. 20 and 21 are sectional views of a seal ring of another embodiment of the invention, shown respectively at zero fluid pressure and at working pressure.
Figure 21:
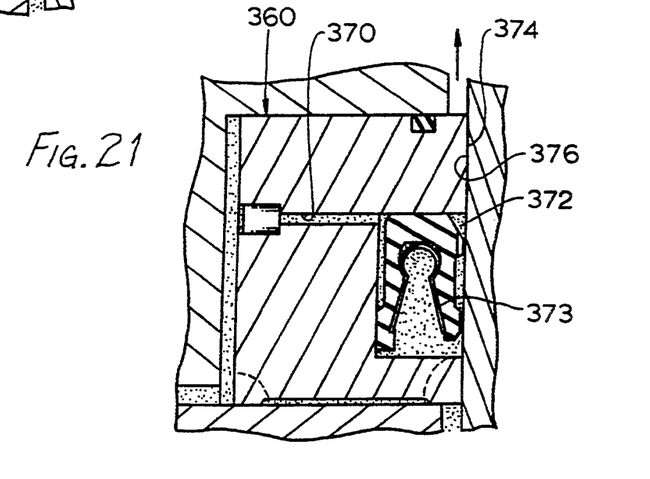

FIG. 20 illustrates a seal ring 360 which holds a check seal arrangement 362. The check seal arrangement includes a check valve 364 and a seal 366. At a fluid pressure below a predetermined level (e.g. below 200 psi for a fluid swivel designed for a working pressure of 2,000 psi), the seal 366 blocks the passage of fluid at a blocking location 368. At the predetermined opening pressure (e.g. 200 psi), the check valve 364 opens and, as shown in FIG. 21, allows pressured oil (at the pressure of fluid in the annular chamber of the fluid swivel) to flow along a passage 370 and to the dynamic side 372 of the seal. The opposite sides of the seal are no longer pressed apart by a large pressure drop across it, and will have a long lifetime of usage. A spring 373 of the seal may press apart the sides with a force equivalent to a fluid pressure on the order of 1 psi. By the time that the opening pressure is reached, the seal ring 360 will have been deformed enough by fluid pressure to assure that its dynamic side 374 makes a fluid-tight seal against the sealed surface region 376. The seal ring 360 is constructed so in the zero pressure condition of FIG. 20, there is a slight gap, or only a very slight interference, between its dynamic side 374 and the sealed surface region 376, to enable assembly of the fluid swivel. The check valve 364 is of a common type that includes a plunger and a spring whose initial compression force is overcome at the opening pressure.

Of the radial seal arrangements (all but FIGS. 10 and 11) only the embodiment of FIG. 8 shows the seal ring positioned to be expanded in diameter by high fluid pressure. However, all of the radial seal arrangements can position the seal ring in a cavity of the inner swivel part, so that high fluid pressure expands the diameter of the seal ring rather than contracting it.

Thus, the invention provides a high pressure fluid swivel and a pressure seal device therefor, which minimizes extrusion of the seal. The seal device includes a seal ring that lies in a cavity of one of the fluid swivel parts, and that can back up a softer seal or can itself seal against a sealed surface. The seal ring is slidable toward and away from the sealed surface and is pushed toward the sealed surface by a pressure source such as the pressure of fluid in the swivel. In one approach to prevent cocking, the upstream and downstream ends of the seal ring are both closely slidably guided in movement toward and away from the sealed surface. In another approach to prevent cocking (which can be used together with the first approach), the dynamic side of the seal ring is supported on the sealed surface against significant cocking, at locations spaced along most of the length of the seal ring parallel to the sealed surface. The seal ring can lie in a cavity of the inner swivel part, with the sealed surface facing toward the swivel axis, so high fluid pressure causes expansion of the seal ring rather than its contraction.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A fluid swivel which can carry fluid flowing from a pressure source that supplies fluid at a pressure that may reach a high working pressure, wherein the fluid swivel includes inner and outer swivel parts and at least one bearing assembly that pivotally connects said swivel parts so one swivel part can pivot about the other, wherein said swivel parts form a fluid-carrying annular chamber between them that is coupled to said pressure source and wherein said fluid swivel forms first and second gap passages between said swivel parts with said gap passages leading from opposite sides of the chamber, with a seal arrangement lying along said second gap passage to seal it and with a first of said swivel parts having a ring-shaped cavity along said first gap passage which holds a seal device and with the second of said swivel parts having a sealed surface lying substantially opposite said cavity, and including a conduit that is coupled to said pressure source and to said seal device to expose said seal device to a fluid pressure which is generally about the same as the pressure of fluid in said annular chamber, where said seal device seals against said sealed surface of the second of said swivel parts, and where said seal device includes a seal ring with portions that can slide within said cavity toward and away from said sealed surface, characterized by:

said cavity has upstream and downstream cavity walls each extending toward and away from said sealed surface, and said seal ring has upstream and downstream ends each lying substantially against a corresponding one of said cavity walls to prevent cocking of said seal ring, with said seal ring being slidable toward said sealed surface relative to said first swivel part when said seal device is exposed to a fluid pressure which is about the same as said high working pressure.

2. The fluid swivel described in claim 1 wherein:

said seal device includes a seal of softer material than said seal ring, said seal having a seal dynamic side lying against said sealed surface, with said seal dynamic side having a downstream end lying against a location on said seal ring;

said seal ring is of largely U-shape, with dynamic portions lying both upstream and downstream of said seal and with each dynamic portion lying close to said sealed surface to prevent cocking of said seal ring by more than about 1°, but with the dynamic side of only said upstream dynamic portion exposed to pressured fluid.

3. The fluid swivel described in claim 1 wherein:

said seal ring has a distal side lying opposite said dynamic side thereof; and including a largely static seal sealing said downstream end of said seal ring to said downstream cavity wall while allowing said seal ring to occasionally slide toward and away from said sealed surface, said static seal lying closer to said sealed surface than to the downstream end of said distal side of said seal ring, to thereby reduce the force pushing said seal ring against said downstream cavity wall and thus allow said seal ring to slide.

4. The fluid swivel described in claim 1 wherein:

said seal device includes a seal of softer material than said seal ring lying in said cavity and having a seal dynamic side lying against said sealed surface region, said seal having a downstream end lying against said seal ring;

said pressure source comprises a valve and a hydrocarbon well inlet which applies a predetermined working fluid pressure of more than 1,000 psi (70 MPa) through said valve to said annular chamber and to said conduit, to urge said seal ring toward said sealed surface region with a force that increases as the pressure of fluid in said annular chamber increases, with said valve being operable to stop applying said working fluid pressure;

the gap distance between said seal ring and said sealed surface, is such that the full pressure length Q of said gap distance, when said predetermined working fluid pressure exists in said annular chamber, is less than the zero pressure length P of said gap distance which exists when there is zero fluid pressure in said annular chamber.

5. The fluid swivel described in claim 4 wherein:

said seal ring is of a material which has a softer surface than said sealed surface, and said zero pressure gap distance is chosen so said backup part touches said sealed surface at at least two locations spaced about said axis when at least said working pressure exists in said annular chamber.

6. The fluid swivel described in claim 1 wherein:

said seal device includes a check seal arrangement (362) which comprises an annular seal lying in said cavity and having a blocking location that seals against said sealed surface when said seal device is exposed to fluid pressure below a predetermined level;

said seal ring has a dynamic side which does not press hard enough against said sealed surface to make a fluid tight seal thereagainst when said fluid pressure is zero, with fluid passing through said conduit pressing against said seal ring to press it hard enough against said sealed surface to make a fluid tight seal thereagainst when said fluid pressure is above said predetermined level.

7. The fluid swivel described in claim 6 wherein:
said seal device comprises a check valve which opens when the fluid pressure is at said predetermined level, to pass fluid to a downstream portion of said seal.

8. The fluid swivel described in claim 1 including:
a key and keyway, one on said seal ring and the other on said first swivel part, said key and keyway being engaged to prevent said seal ring from turning relative to said first seal part while allowing seal ring to slide within said cavity toward and away from said sealed surface.

9. The fluid swivel described in claim 1 wherein:
said outer swivel part is pivotable about a swivel axis relative to said inner swivel part;
said first swivel part which holds said seal device is said inner swivel part, and said sealed surface on said second swivel part, faces radially toward said swivel axis, with said seal ring being urged by fluid pressure to expand in diameter to thereby slide toward said sealed surface.

10. A high pressure fluid swivel which passes fluid from a fluid source having a working pressure of over 1,000 psi (70 KPa), which includes inner and outer swivel parts and at least one bearing assembly that pivotally connects said swivel parts so one swivel part can pivot about the other, wherein said swivel parts form a fluid-carrying annular chamber between them that is coupled to said pressure source and wherein said fluid swivel forms a pair of gap passages between said swivel parts with said gap passages leading from opposite sides of the chamber, with a seal arrangement lying along said second passage to seal it, with a first of said swivel parts having a ring-shaped cavity along a first of said gap passages which holds a seal device and with the second of said swivel parts having a sealed surface lying substantially opposite said cavity, and including a conduit that is coupled to said pressure source and to said seal device to expose said seal device to pressured fluid and that seals against said sealed surface of the second of said swivel parts, where said seal device includes a seal ring of a hardness of at least that of engineering plastics and that has portions that can slide within said cavity toward and away from said sealed surface, characterized by:

said seal ring has upstream and downstream ends and said seal ring has a dynamic side lying adjacent to said sealed surface and an opposite distal side;
said dynamic side of said seal ring has upstream and downstream locations that each lie substantially against said sealed surface and that are spaced apart by at least half the length of said seal ring between said upstream and downstream ends;
said upstream and downstream locations each being spaced an average of at least one thousandth inch (0.025 mm) from said sealed surface when there is zero fluid pressure in said cavity, with said locations both lying close enough to said sealed surface when said fluid at over 1,000 psi (70 KPa) lies in said cavity, to prevent said seal ring from tilting by more than 0.5° before touching said sealed surface.

11. The fluid swivel described in claim 10 wherein:
said seal ring has a ring-shaped seal-holding recess facing said sealed surface;
said seal device includes a ring-shaped seal of softer material than said seal ring and lying in said recess of seal ring and against said sealed surface.

12. The fluid swivel described in claim 10 wherein:
said upstream location of said seal ring has a dynamic side which does not press hard enough against said sealed surface to make a fluid tight seal thereagainst when said fluid pressure is zero, but which does press hard enough against said sealed surface to make a fluid tight seal thereagainst when said fluid pressure is above a predetermined level;
said seal device includes a check seal arrangement which comprises an annular seal of softer material than said seal ring lying in said cavity and having a blocking location that seals against said sealed surface when said seal device is exposed to fluid pressure below a predetermined level, but which is substantially free of being forced toward said sealed surface by fluid pressure when said fluid pressure is above said predetermined level.

13. The fluid swivel described in claim 10 wherein:
said pressured fluid in said cavity is a lubricating liquid;
said seal ring has a recess facing said sealed surface, and including a seal of softer material than said seal ring lying in said recess and having a side lying against said sealed surface;
said dynamic side of said seal ring has upstream and downstream portions that lie respectively upstream and downstream of said seal, and said downstream portion is recessed from an imaginary extension of said upstream portion, to thereby encourage any contact between said seal ring and said seal surface to occur at a lubricated region.

14. The fluid swivel described in claim 10 wherein:
substantially the entire upstream end of said seal ring is exposed to said pressured fluid, but said downstream end of said seal ring is sealed to the walls of said cavity at a mid location (110, FIG. 2) spaced from both said dynamic side and said distal side of said seal ring, with said mid location lying closer to said dynamic side than to said distal side.

15. The fluid swivel described in claim 10 including:
a key and keyway, one on said seal ring and the other on said first swivel part, said key and keyway being engaged to prevent said seal ring from turning relative to said first seal part while allowing seal ring to slide within said cavity toward and away from said sealed surface.

16. The fluid swivel described in claim 10 including:
a hydrocarbon well inlet which applies a predetermined working fluid pressure of more than 1,000 psi (70 MPa) to said annular chamber; and wherein:
said seal ring has a seal-holding recess facing said sealed surface, and including a seal of softer material than said seal ring lying in said recess and against said sealed surface;

said pressure source urges said seal ring toward said sealed surface with a force that increases as the pressure of fluid in said annular chamber increases;

there is a gap of at least zero length between said seal ring and said sealed surface, with the zero pressure length P of said gap which exists when there is zero fluid pressure in said annular chamber being chosen so the full pressure length Q of said gap, when said predetermined working fluid pressure exists in said annular chamber, is no more than said zero pressure length.

17. The fluid swivel described in claim 16 wherein:
said hard seal ring has a low friction dynamic face that directly contacts and seals against said sealed surface, with the rigidity of said seal ring chosen so an increase in fluid pressure between zero and said working pressure causes a change in the diameter of said seal ring which is greater than and opposite to the change in diameter of said sealed surface, and so said dynamic face of said seal ring presses with greater force against said sealed surface when fluid in said cavity is at said working pressure than when it is at zero pressure.

18. The fluid swivel described in claim 10 wherein:
said outer swivel part is pivotable about a swivel axis relative to said inner swivel part;
said first swivel part which holds said seal device is said inner swivel part, and said sealed surface on said second swivel part faces radially toward said swivel axis, with said seal ring being urged by fluid pressure to expand in diameter to thereby slide toward said sealed surface.

19. A high pressure fluid swivel which is designed to pass fluid having a working pressure of over 1,000 psi (70 KPa), which includes inner and outer swivel parts and at least one bearing assembly that pivotally connects said swivel parts so one swivel part can pivot about the other about a swivel axis, wherein said swivel parts form a fluid-carrying annular chamber between them that is coupled to said pressure source and wherein said swivel parts also form at least one gap passage between them that leads from said chamber, with a first of said swivel parts having a ring-shaped cavity along said gap passage which holds a seal device and with the second of said swivel parts having a sealed surface lying substantially opposite said cavity, and including a conduit that is coupled to said pressure source and to said seal device to expose said seal device to pressured fluid, with said seal device sealed to said first swivel part and sealing radially against said sealed surface of the second of said swivel parts, where said seal device includes a hard seal ring with a body of a hardness of at least that of engineering plastics and that has portions that can slide within said cavity toward and away from said sealed surface, characterized by:
said hard seal ring is positioned so fluid in said cavity presses said seal ring toward said sealed surface, and said hard seal ring is constructed so it presses directly against said sealed surface when said fluid at substantially said working pressure lies in said cavity.

20. The fluid swivel described in claim 19 wherein:
said sealed surface faces radially inwardly toward said swivel axis, and said hard seal ring is urged to expand in diameter by fluid in said cavity.

21. A high pressure fluid swivel which is designed to pass fluid having a working pressure of over 1,000 psi (70 KPa), which includes inner and outer swivel parts and at least one bearing assembly that pivotally connects said swivel parts so one swivel part can pivot about the other about a swivel axis, wherein said swivel parts form a fluid-carrying annular chamber between them that is coupled to said pressure source and wherein said fluid swivel forms at least one gap passage that leads from said chamber, with a first of said swivel parts having a ring-shaped cavity along said gap passage which holds a seal device and with the second of said swivel parts having a sealed surface lying substantially opposite said cavity, and including a conduit that is coupled to said pressure source and to said seal device to expose said seal device to pressured fluid, with said seal device sealed to said first swivel part and sealing against said sealed surface of the second of said swivel parts, where said seal device includes a seal ring of a hardness of at least that of engineering plastics and that is deformed by said pressured fluid within said cavity toward said sealed surface, characterized by:
said sealed surface is formed on said outer swivel part and faces primarily toward said swivel axis, and said hard seal ring is positioned in said cavity so pressured fluid in said cavity urges expansion of the diameter of said hard seal ring.

22. The fluid swivel described in claim 21 wherein:
said hard seal ring is constructed so it presses directly against said sealed surface and makes a fluid tight seal therewith when the pressure of said pressured fluid is at about said working pressure.

23. The fluid swivel described in claim 21 wherein:
said hard seal ring is largely U-shaped and includes a pair of arms joined by a base, with said arms projecting from said base toward said sealed surface;
said seal device includes an annular seal of softer material than said hard seal ring and lying between said arms and between said base and said sealed surface.

* * * * *